US012757163B2

(12) United States Patent
Mu

(10) Patent No.: US 12,757,163 B2
(45) Date of Patent: Oct. 6, 2026

(54) METHOD FOR MONITORING PAGING MESSAGE, APPARATUS FOR MONITORING PAGING MESSAGE, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 307 days.

(21) Appl. No.: 18/557,435

(22) PCT Filed: Apr. 26, 2021

(86) PCT No.: PCT/CN2021/090043
§ 371 (c)(1),
(2) Date: Oct. 26, 2023

(87) PCT Pub. No.: WO2022/226742
PCT Pub. Date: Nov. 3, 2022

(65) Prior Publication Data
US 2024/0214984 A1 Jun. 27, 2024

(51) Int. Cl.
*H04W 68/00* (2009.01)
*H04W 68/02* (2009.01)

(52) U.S. Cl.
CPC ......... *H04W 68/005* (2013.01); *H04W 68/02* (2013.01)

(58) Field of Classification Search
CPC ............................ H04W 68/005; H04W 68/02
See application file for complete search history.

(56) References Cited

U.S. PATENT DOCUMENTS 11,659,617 B2 * 5/2023 Mi ........................ H04W 68/02 370/310
12,452,836 B2 * 10/2025 Dong .................. H04W 68/005
2020/0252907 A1 8/2020 Rune
2021/0152992 A1 * 5/2021 Balasubramanian ........................ H04W 72/02

(Continued)

FOREIGN PATENT DOCUMENTS

CN 110351815 A 10/2019
CN 111357332 A 6/2020

(Continued)

OTHER PUBLICATIONS

International Search Report mailed on Jan. 24, 2022 in PCT/CN2021/090043 filed on Apr. 26, 2021 (6 pages).

(Continued)

*Primary Examiner* — Dhaval V Patel
(74) *Attorney, Agent, or Firm* — Oblon, McClelland, Maier & Neustadt, L.L.P.

(57) ABSTRACT

A method for monitoring a paging message is provided. The method for monitoring a paging message is performed by a terminal, and includes receiving multiple paging indication information, the multiple paging indication information being configured to respectively instruct different types of terminals to monitor paging messages, determining paging indication information corresponding to a type of the terminal among the multiple paging indication information, and monitoring the paging message on the basis of determined paging indication information.

20 Claims, 5 Drawing Sheets

(56) References Cited

U.S. PATENT DOCUMENTS

| | | | | |
|---|---|---|---|---|
| 2023/0049119 | A1* | 2/2023 | Liu | H04W 52/0225 |
| 2024/0188040 | A1* | 6/2024 | Wu | H04W 76/28 |
| 2024/0305976 | A1* | 9/2024 | Hong | H04W 8/20 |
| 2024/0381309 | A1* | 11/2024 | Xu | H04W 68/02 |

FOREIGN PATENT DOCUMENTS

| | | | |
|---|---|---|---|
| CN | 111567126 | A | 8/2020 |
| CN | 111819813 | A1 | 10/2020 |
| CN | 112205009 | A | 1/2021 |
| WO | WO 2015/042862 | A1 | 4/2015 |

OTHER PUBLICATIONS

Chinese office action issued May 7, 2022 in CN 202180001301.4, 10 pages.
"Paging Enhancements for UE Power Saving in", Media Tek Inc., R2-2006361, Revision of R2-2007190, 3GPP TSG-RAN WG2 Meeting #111 electronic, 2020, 8 pages.
"Paging enhancements for idle/inactive-mode UE", Huawei, HiSilicon, British Telecom, R2-2010244, 3GPP TSG-RAN WG2 Meeting #112 electronic, 2020, 5 pages.
"UE-Group Paging Early Indication", Media Tek Inc., R2-2101539, 3GPP TSG-RAN WG2 Meeting #113 electronic, 2021, 4 pages.
"Paging Enhancements for UE Power Saving in NR", Media Tek Inc., R2-2009785, 3GPP TSG-RAN WG2 Meeting #112-e, 2020, 5 pages.

* cited by examiner

METHOD FOR MONITORING PAGING MESSAGE, APPARATUS FOR MONITORING PAGING MESSAGE, AND STORAGE MEDIUM

CROSS REFERENCE TO RELATED APPLICATION

The present disclosure is the U.S. national phase application of International Application No. PCT/CN2021/090043 filed on Apr. 26, 2021, the content of which is incorporated herein by reference in its entirety for all purposes.

BACKGROUND

Technical Field

The present disclosure relates to the field of wireless communication technology, in particular to a method for monitoring a paging message, an apparatus for monitoring a paging message, and a storage medium.

Description of the Related Art

In a new generation of communication technology, in order to avoid useless paging monitoring by terminals in a paging occasion (PO), indication information (PEI) is introduced in Physical Downlink Control Channel (PDCCH) of a paging message. The terminal determines the detection of subsequent paging PDCCH and/or paging Physical Downlink Shared Channel (PDSCH) by detecting the PEI.

SUMMARY

According to a first aspect of the present disclosure, a method for monitoring a paging message is provided. The method for monitoring a paging message is applied to a terminal, and includes receiving multiple paging indication information, wherein the multiple paging indication information is configured to respectively instruct different types of terminals to monitor the paging message, and determining paging indication information corresponding to a type of the terminal among the multiple paging indication information, and monitoring the paging message based on the paging indication information.

According to a second aspect of the present disclosure, a method for monitoring a paging message is provided. The method for monitoring a paging message is applied to a network-side device, includes: sending multiple paging indication information, wherein the multiple paging indication information is configured to respectively instruct different types of terminals to monitor the paging message.

According to a third aspect of the present disclosure, an apparatus for monitoring a paging message is provided. The apparatus for monitoring a paging message is applied to a terminal, and includes a receiving module configured to receive multiple paging indication information, wherein the multiple paging indication information is configured to respectively instruct different types of terminals to monitor the paging message and a determination module configured to determine paging indication information corresponding to a type of the terminal among the multiple paging indication information, and monitoring the paging message based on the paging indication information.

According to a fourth aspect of the present disclosure, an apparatus for monitoring a paging message is provided. The apparatus for monitoring a paging message is applied to a network-side device, and include a sending module is configured to send multiple paging indication information. The multiple paging indication information is configured to respectively instruct different types of terminals to monitor the paging message.

According to a fifth aspect of the present disclosure, a device for monitoring a paging message is provided, and includes a processor and a memory for storing instructions executable by the processor. The processor is configured to implement the method for monitoring a paging message described in the first aspect or any embodiments of the first aspect, or to implement the method for monitoring a paging message described in the second aspect or any embodiments of the second aspect.

According to a sixth aspect of the present disclosure, a non-transitory computer-readable storage medium is provided, which when instructions in the storage medium are executed by a processor of a mobile terminal, causes the method for monitoring a paging message described in the first aspect or any embodiments of the first aspect, or the method for monitoring a paging message described in the second aspect or any embodiments of the second aspect, to be implemented by the mobile terminal.

It should be understood that the above general description and the following detailed description are only illustrative and explanatory, and do not limit the present disclosure.

BRIEF DESCRIPTION OF THE DRAWINGS

The drawings herein are incorporated into and form a part of the description, showing embodiments in accordance with the present disclosure, and served together with the description to explain the principles of the present disclosure.

DETAILED DESCRIPTION OF THE PREFERRED EMBODIMENTS

Figure 1:
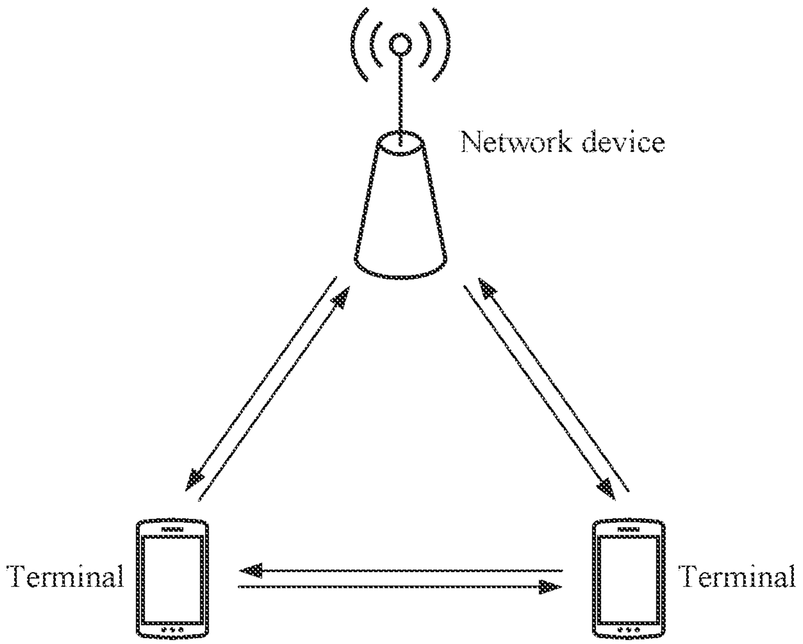
FIG. 1 is an architecture diagram of a communication system including a network device and a terminal according to some embodiments.

Embodiments will be described herein in detail, and examples thereof are shown in the drawings. When the following description refers to the drawings, unless otherwise indicated, the same numerals in different drawings represent the same or similar elements. Embodiments described in the following exemplary embodiments do not represent all embodiments consistent with the present disclosure. On the contrary, they are only examples of devices and methods consistent with some aspects of the present disclosure as detailed in the appended claims.

FIG. 1 is an architecture diagram of a communication system including a network device and a terminal according to some embodiments. Embodiments of the present disclosure provide a communication method, which can be applied to the architecture of the communication system shown in FIG. 1. As shown in FIG. 1, a network-side device can send signaling based on the architecture shown in FIG. 1.

It can be understood that the communication system including the network device and the terminal shown in FIG. 1 is only a schematic explanation, and the wireless communication system can also include other network devices, for example, a core network device, a wireless relay device, and a wireless backhaul device, which are not shown in FIG. 1. The number of network devices and terminals included in the wireless communication system is not limited in embodiments of the present disclosure.

It can be further understood that the wireless communication system in embodiments of the present disclosure is a network that provides wireless communication functions. Wireless communication systems can adopt different communication technologies, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), and carrier sense multiple access with collision avoidance. Networks can be divided according to factors such as different capacities, rates, and latencies, into 2G (generation) network, 3G network, 4G network, or a future evolved network, such as 5G network. 5G network can also be referred to as New Radio (NR). For the convenience of description, the wireless communication network is sometimes referred to as a network in the present disclosure.

Further, the network device involved in the present disclosure can also be referred to as a wireless access network device. The wireless access network device can be a base station, an evolved node B, a home base station, an access point (AP) in wireless fidelity (WIFI) system, a wireless relay node, a wireless backhaul node, a transmission point (TP) or a transmission and reception point (TRP), etc. The wireless access network device can also be gNB in NR system. Alternatively, the wireless access network device can be a component or a part of devices that constitute the base station. When used as a communication system in an Internet of vehicles (V2X), the network device can also be an onboard device. It should be understood that specific technologies and forms adopted by the network device are not limited in embodiments of the present disclosure.

Further, the terminal involved in the present disclosure can also be referred to as a terminal device, user equipment (UE), a mobile station (MS), a mobile terminal (MT), etc., which are devices that provide voice and/or data connection to users. For example, the terminal can be a handheld device, a vehicle mounted device with wireless connection functions, etc. Some examples of terminals include smart mobile phones, pocket personal computers (PPCs), handheld computers, personal digital assistants (PDAs), laptops, tablets, wearable devices, or vehicle mounted devices. In addition, a communication system in an Internet of vehicles (V2X), the terminal device can also be an onboard device. It should be understood that specific technologies and forms adopted by the terminal are not limited in embodiments of the present disclosure.

Due to the vigorous development of the Internet of Things, it has brought many conveniences to human lives and works. Machine Type Communication (MTC) and Narrow Band Internet of Things (NB-IoT) are typical representatives of cellular IoT technology. At present, these technologies have been widely used in many fields such as smart cities (for example, meter reading), smart agriculture (for example, temperature and humidity information collection), and smart transportation (for example, shared bicycles).

In the communication system, two types of technologies. MTC and NB-IoT, are proposed for scenarios such as low rate and high latency in IoT services, for example, meter reading and environmental monitoring. At present. NB-IoT can support a maximum rate of hundreds of Kbps, and MTC can support a maximum rate of several Mbps. With the continuous development of IoT services (for example, monitoring, smart home, wearable devices, and industrial sensor detection), a rate of tens of Mbps to one hundred Mbps is generally required, and the requirements for latency are also relatively high. Therefore, in the communication system. MTC and NB-IoT are no longer able to meet the current requirements of IoT services. Simultaneously. MTC and NB-IoT are generally deployed in scenarios such as basements, outdoors, and other areas, where it is difficult to charge or replace batteries. Therefore, terminals associated with MTC and NB-IoT are limited by hardware, resulting in less coverage capacity than general wireless communication terminals. Also, due to the impact of the application environment, the power saving of a device is also characteristics of MTC and NB-IoT. Based on such situation, it has been proposed to design a new user device in 5G NR to meet the requirements of this mid-range IoT device. In the current 3GPP (3rd Generation Partnership Project) standardization, this new type of terminals is referred to as a Redcap terminal or an NR-lite (New Radio-Light) for short.

In the related technology, a search space that carries paging messages is the type-2 PDCCH common search space (CSS), also known as a paging search space. In the paging search space, the PDCCH carried paging messages is scrambled by P-Radio Network Tempory Identity (RNTI) through cyclic redundancy check (CRC). In communication protocols. P-RNTI is represented through a fixed field FFFE. The general terminals and the Redcap terminals need to share one paging message, including the same paging PDCCH and paging PDSCH. Simultaneously, in order to avoid useless paging monitoring by the terminal in PO, indication information (PEI) is introduced in the paging PDCCH, so as to avoid useless detection and waste of power at the terminal. For example, when there is no paging DCI and paging PDSCH for one PO, the terminal still needs to detect this PO. After the PEI is introduced, the terminal can detect the indication information to determine whether to continue detecting subsequent paging PDCCH and/or paging PDSCH.

However, in the related technology. PEI is shared among all terminals. In fact, the paging probability of the Redcap terminal is different from that of a general terminal, the system messages monitored by the Redcap terminal and the general terminal are different, and even some transmission characteristics of the Redcap terminal are different. Therefore, sharing the same PEI among all terminals would lead to unnecessary paging monitoring by some terminals.

Embodiments of the present disclosure provide a method for monitoring a paging message, the method for monitoring a paging message can receive multiple paging indication information, and the multiple paging indication information is configured to respectively instruct different types of terminals to monitor the paging message, read corresponding paging indication information based on a type of the terminal, and monitor the paging message based on the paging indication information. According to embodiments of the present disclosure, unnecessary paging monitoring by the terminal can be avoided.

Figure 2:
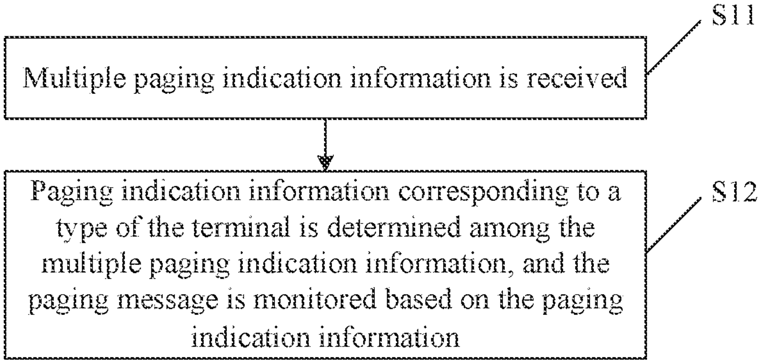
FIG. 2 is a flowchart of a method for monitoring a paging message according to some embodiments.

FIG. 2 is a flowchart of a method for monitoring a paging message according to some embodiments. As shown in FIG. 2, the method for monitoring the paging message is performed by the terminal, and includes the following steps.

In step S11, multiple paging indication information is received.

In some embodiments of the present disclosure, the multiple paging indication information is configured to respectively instruct different types of terminals to monitor the paging message. Different types of terminals can include general terminals and Redcap terminals. Also, different types of terminals can include Redcap terminals with one receiving antenna and Redcap terminals with two receiving antennas.

In step S12, paging indication information corresponding to a type of the terminal is determined among the multiple paging indication information, and the paging message is monitored based on the paging indication information determined.

According to the method for monitoring the paging message provided by the present disclosure, corresponding paging indication information can be determined for different types of terminals, so as to instruct corresponding terminals to perform paging monitoring, thereby avoiding unnecessary paging monitoring by other types of terminals.

In some embodiments of the present disclosure, the multiple paging indication information can be received based on PDCCH.

Figure 3:
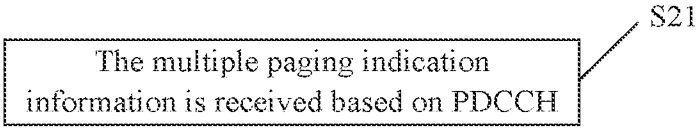
FIG. 3 is a flowchart of a method for monitoring a paging message according to some embodiments.

FIG. 3 is a flowchart of a method for monitoring a paging message according to some embodiments. As shown in FIG. 3, the method for monitoring the paging message is performed by the terminal, and includes the following steps.

In step S21, the multiple paging indication information is received based on PDCCH.

In some embodiments of the present disclosure. PDCCH includes multiple first information fields, and the multiple first information fields are configured to instruct different types of terminals to monitor the paging message.

In some embodiments, the terminal receives multiple paging indication information based on PDCCH. The multiple paging indication information can include multiple first information fields. The multiple first information fields (i.e., multiple paging indication information) can include first paging indication information and second paging indication information. In some embodiments, the first paging indication information is configured to instruct the first type of terminals to monitor the paging message, and the second paging indication information is configured to instruct the second type of terminals to monitor the paging message. In some embodiments, the first type of terminals can be terminals with a normal capacity, and the second type of terminals can be Redcap terminals. If the second type of terminals are Redcap terminals, the second paging indication information corresponding to the second type of terminals can further include multiple sub paging indication information, which is configured to instruct different types of Redcap terminals. For example, the first sub paging indication information is configured to instruct a Redcap terminal with one receiving antenna to monitor the paging message, and the second sub paging indication information is configured to instruct a Redcap terminal with two receiving antennas to monitor the paging message. These embodiments are only examples of the present disclosure and not a specific limitation to the present disclosure.

In some embodiments of the present disclosure, the terminal receives multiple paging indication information based on PDCCH, and multiple second information fields are further included in the PDCCH. In some embodiments, the multiple second information fields are configured to instruct different types of terminals to update a system message. For example, a first second information field is configured to instruct the first type of terminals to update the system message, and a second second information field is configured to instruct the second type of terminals to update the system message.

Figure 4:
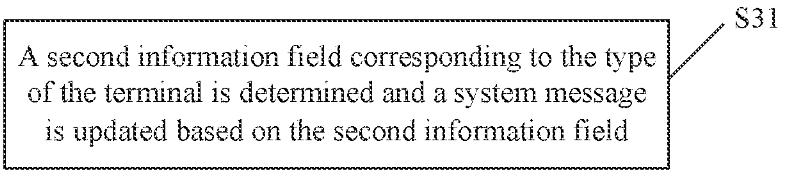
FIG. 4 is a flowchart of a method for monitoring a paging message according to some embodiments.

FIG. 4 is a flowchart of a method for monitoring a paging message according to some embodiments. As shown in FIG. 4, the method for monitoring the paging message is performed by the terminal, and includes the following steps.

In step S31, a second information field corresponding to the type of the terminal is determined and a system message is updated based on the second information field.

In some embodiments of the present disclosure, the terminal receives multiple paging indication information based on PDCCH, and can also determine multiple second information fields among the multiple paging indication information. The terminal determines the second information field corresponding to the type of the terminal among the multiple second information fields based on the type of the terminal itself, and updates the system message based on the second information field.

In some embodiments of the present disclosure, the multiple paging indication information can be received based on a sequence.

Figure 5:
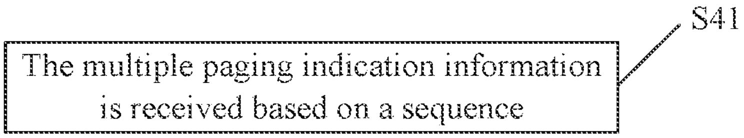
FIG. 5 is a flowchart of a method for monitoring a paging message according to some embodiments.

FIG. 5 is a flowchart of a method for monitoring a paging message according to some embodiments. As shown in FIG. 5, the method for monitoring the paging message is performed by the terminal, and includes the following steps.

In step S41, the multiple paging indication information is received based on a sequence.

In some embodiments of the present disclosure, the sequence includes multiple different sequences, and the multiple different sequences are configured to instruct different types of terminals to monitor paging messages.

In some embodiments, the multiple paging indication information can include multiple different sequences, and the multiple different sequences include a first sequence and a second sequence. In some embodiments, the first sequence is configured to instruct the first type of terminals to monitor the paging message, and the second sequence is configured to instruct the second type of terminals to monitor the paging message. In some embodiments, the first sequence is configured to instruct general terminals to monitor the paging message, and the second sequence is configured to instruct Redcap terminals to monitor the paging message. The terminal receives different sequences and determines to monitor the paging message based on the type of the terminal itself. In some embodiments, if the second type of terminals is a Redcap terminal, the second type of terminals further includes a first subtype of terminals and a second subtype of terminals. In some embodiments, the first subtype of terminals is a Redcap terminal with one receiving antenna, and the second subtype of terminals is a Redcap terminal with two receiving antennas. The first subsequence in the second sequence is configured to instruct the first subtype of terminals to monitor the paging message, and the second subsequence in the second sequence is configured to instruct the second subtype of terminals to monitor the paging message.

Figure 6:
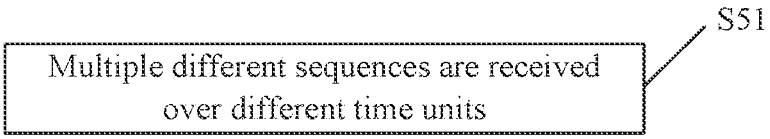
FIG. 6 is a flowchart of a method for monitoring a paging message according to some embodiments.

FIG. 6 is a flowchart of a method for monitoring a paging message according to some embodiments. As shown in FIG. 6, the method for monitoring the paging message is performed by the terminal, and includes the following steps.

In step S51, multiple different sequences are received over different time units.

In some embodiments of the present disclosure, the terminal can receive multiple different sequences over different time units. The terminal receives the corresponding time unit and determines the corresponding sequence based on the type of the terminal itself, and determines to monitor the paging message based on the sequence.

Based on the same concept, embodiments of the present disclosure also provide a method for monitoring a paging message.

Figure 7:
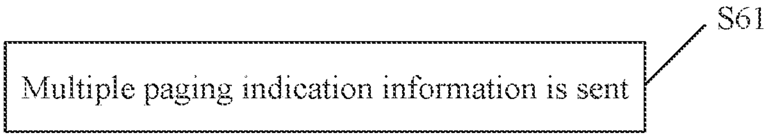
FIG. 7 is a flowchart of a method for monitoring a paging message according to some embodiments.

FIG. 7 is a flowchart of a method for monitoring a paging message according to some embodiments. As shown in FIG. 7, the method for monitoring the paging message is performed by a network-side device, and includes the following steps.

In step S61, multiple paging indication information is sent.

In some embodiments of the present disclosure, the network-side device can send multiple paging indication information, and the multiple paging indication information is configured to respectively instruct different types of terminals to monitor the paging message. Different types of terminals can include general terminals and Redcap terminals. Also, different types of terminals can include Redcap terminals with one receiving antenna and Redcap terminals with two receiving antennas.

According to the method for monitoring the paging message provided by the present disclosure, corresponding paging indication information can be determined for different types of terminals, so as to instruct corresponding terminals to perform paging monitoring, thereby avoiding unnecessary paging monitoring by other types of terminals.

In some embodiments of the present disclosure, the multiple paging indication information can be received based on PDCCH.

Figure 8:
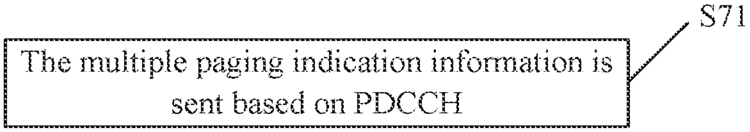
FIG. 8 is a flowchart of a method for monitoring a paging message according to some embodiments.

FIG. 8 is a flowchart of a method for monitoring a paging message according to some embodiments. As shown in FIG. 8, the method for monitoring the paging message is performed by a network-side device, and includes the following steps.

In step S71, the multiple paging indication information is sent based on PDCCH.

In some embodiments of the present disclosure. PDCCH includes multiple first information fields, and the multiple first information fields are configured to instruct different types of terminals to monitor the paging message.

In some embodiments, the network-side device sends multiple paging indication information based on PDCCH. The multiple paging indication information can include multiple first information fields. The multiple first information fields (i.e., multiple paging indication information) can include first paging indication information and second paging indication information. In some embodiments, the first paging indication information is configured to instruct the first type of terminals to monitor the paging message, and the second paging indication information is configured to instruct the second type of terminals to monitor the paging message. In some embodiments, the first type of terminals can be terminals with a normal capacity, and the second type of terminals can be Redcap terminals. If the second type of terminals are Redcap terminals, the second paging indication information corresponding to the second type of terminals can further include multiple sub paging indication information, which is configured to instruct different types of Redcap terminals. For example, the first sub paging indication information is configured to instruct a Redcap terminal with one receiving antenna to monitor the paging message, and the second sub paging indication information is configured to instruct a Redcap terminal with two receiving antennas to monitor the paging message. These embodiments are only examples of the present disclosure and not a specific limitation to the present disclosure.

In some embodiments of the present disclosure, if the terminal sends multiple paging indication information based on PDCCH, multiple second information fields are further included in the PDCCH. In some embodiments, the multiple second information fields are configured to instruct different types of terminals to update system messages. For example, a first second information field is configured to instruct the first type of terminals to update system messages, and a second second information field is configured to instruct the second type of terminals to update system messages.

In some embodiments of the present disclosure, the paging indication information sent by the network-side device based on PDCCH further includes multiple second information fields. The terminal can determine a second information field corresponding to the type of the terminal among the multiple second information fields based on the type of the terminal itself, and update the system message based on the second information field.

In some embodiments of the present disclosure, the multiple indication information can be sent based on a sequence.

Figure 9:
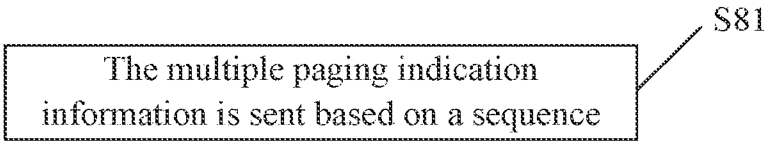
FIG. 9 is a flowchart of a method for monitoring a paging message according to some embodiments.

FIG. 9 is a flowchart of a method for monitoring a paging message according to some embodiments. As shown in FIG. 9, the method for monitoring the paging message is performed by a network-side device, and includes the following steps.

In step S81, the multiple paging indication information is sent based on a sequence.

In some embodiments of the present disclosure, the sequence includes multiple different sequences, and the multiple different sequences are configured to instruct different types of terminals to monitor paging messages.

In some embodiments, the multiple paging indication information can include multiple different sequences, and the multiple different sequences include a first sequence and a second sequence. In some embodiments, the first sequence is configured to instruct the first type of terminals to monitor the paging message, and the second sequence is configured to instruct the second type of terminals to monitor the paging message. In some embodiments, the first sequence is configured to instruct general terminals to monitor the paging message, and the second sequence is configured to instruct Redcap terminals to monitor the paging message. The terminal receives different sequences and determines to monitor the paging message based on the type of the terminal itself. In some embodiments, if the second type of terminals is a Redcap terminal, the second type of terminals further includes a first subtype of terminals and a second subtype of terminals. In some embodiments, the first subtype of terminals is a Redcap terminal with one receiving antenna, and the second subtype of terminals is a Redcap terminal with two receiving antennas. The first subsequence in the second sequence is configured to instruct the first subtype of terminals to monitor the paging message, and the second subsequence in the second sequence is configured to instruct the second subtype of terminals to monitor the paging message.

Figure 10:
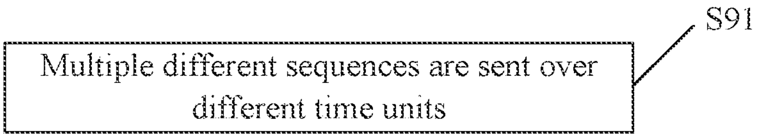
FIG. 10 is a flowchart of a method for monitoring a paging message according to some embodiments.

FIG. 10 is a flowchart of a method for monitoring a paging message according to some embodiments. As shown in FIG. 10, the method for monitoring the paging message is performed by a network-side device, and includes the following steps.

In step S91, multiple different sequences are sent over different time units.

In some embodiments of the present disclosure, the network-side device can send multiple different sequences over different time units. The terminal receives the corresponding time unit and determines the corresponding sequence based on the type of the terminal itself, and determines to monitor the paging message based on the sequence.

Based on the same concept, embodiments of the present disclosure also provide an apparatus for monitoring a paging message.

It can be understood that the resource allocation apparatus provided by embodiments of the present disclosure include a hardware structure and/or a software module corresponding to each function in order to realize the above functions. In combination with the units and algorithm steps in examples disclosed in embodiments of the present disclosure, embodiments of the present disclosure can be implemented in the form of hardware or a combination of hardware and computer software. Whether a function is implemented in the way of hardware or computer software driving the hardware depends on a specific application and design constraints of a technical solution. Those skilled in the art can use different methods to implement the described functions for each specific application, but such an implementation should not be considered beyond the scope of technical solutions of embodiments of the present disclosure.

Figure 11:
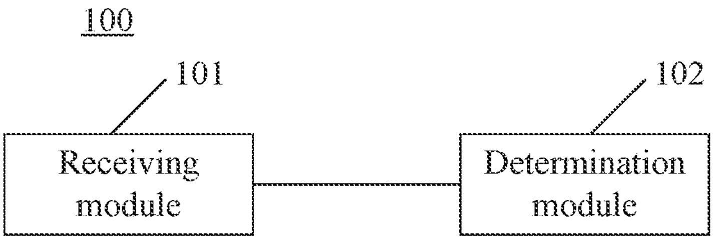
FIG. 11 is a block diagram of an apparatus for monitoring a paging message according to some embodiments.

FIG. 11 is a block diagram of an apparatus for monitoring a paging message according to some embodiments. Referring to FIG. 11, the apparatus 100 for monitoring the paging message includes a receiving module 101 and a determination module 102.

The receiving module 101 is configured to receive multiple paging indication information, the multiple paging indication information being configured to respectively instruct different types of terminals to monitor the paging message. The determination module 102 is configured to determine paging indication information corresponding to a type of the terminal among the multiple paging indication information, and monitor the paging message based on the paging indication information.

In some embodiments of the present disclosure, the receiving module 101 is configured to receive the multiple paging indication information based on Physical Downlink Control Channel (PDCCH), the PDCCH including multiple first information fields, and the multiple first information fields are configured to instruct different types of terminals to monitor the paging message.

In some embodiments of the present disclosure, the PDCCH further includes multiple second information fields. The multiple second information fields are configured to instruct different types of terminals to update a system message.

The determination module 102 is further configured to determine a second information field corresponding to the type of the terminal and update the system message based on the second information field.

In some embodiments of the present disclosure, the receiving module 101 is configured to receive the multiple paging indication information based on a sequence, the sequence including multiple different sequences, and the multiple different sequences are configured to instruct different types of terminals to monitor paging messages.

In some embodiments of the present disclosure, the receiving module 101 is configured to receive multiple different sequences over different time units.

Figure 12:
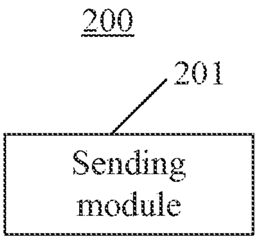
FIG. 12 is a block diagram of an apparatus for monitoring a paging message according to some embodiments.

FIG. 12 is a block diagram of an apparatus for monitoring a paging message according to some embodiments. Referring to FIG. 12, the apparatus 200 for monitoring a paging message includes a sending module 201.

The sending module 201 is configured to send multiple paging indication information, the multiple paging indication information being configured to respectively instruct different types of terminals to monitor the paging message.

In some embodiments of the present disclosure, the sending module 201 is configured to send the multiple paging indication information based on Physical Downlink Control Channel (PDCCH), the PDCCH including multiple first information fields. The multiple first information fields are configured to instruct different types of terminals to monitor the paging message.

In some embodiments of the present disclosure, the PDCCH further includes multiple second information fields. The multiple second information fields are configured to instruct different types of terminals to update system messages.

In some embodiments of the present disclosure, the sending module 201 is configured to send the multiple paging indication information based on a sequence, the sequence including multiple different sequences, and the multiple different sequences are configured to instruct different types of terminals to monitor paging messages.

In some embodiments of the present disclosure, the sending module 201 is configured to send multiple different sequences over different time units.

As for the apparatus in the above embodiments, specific ways in which each module performs the function has been described in detail in the method embodiments, which will not be described in detail here.

Figure 13:
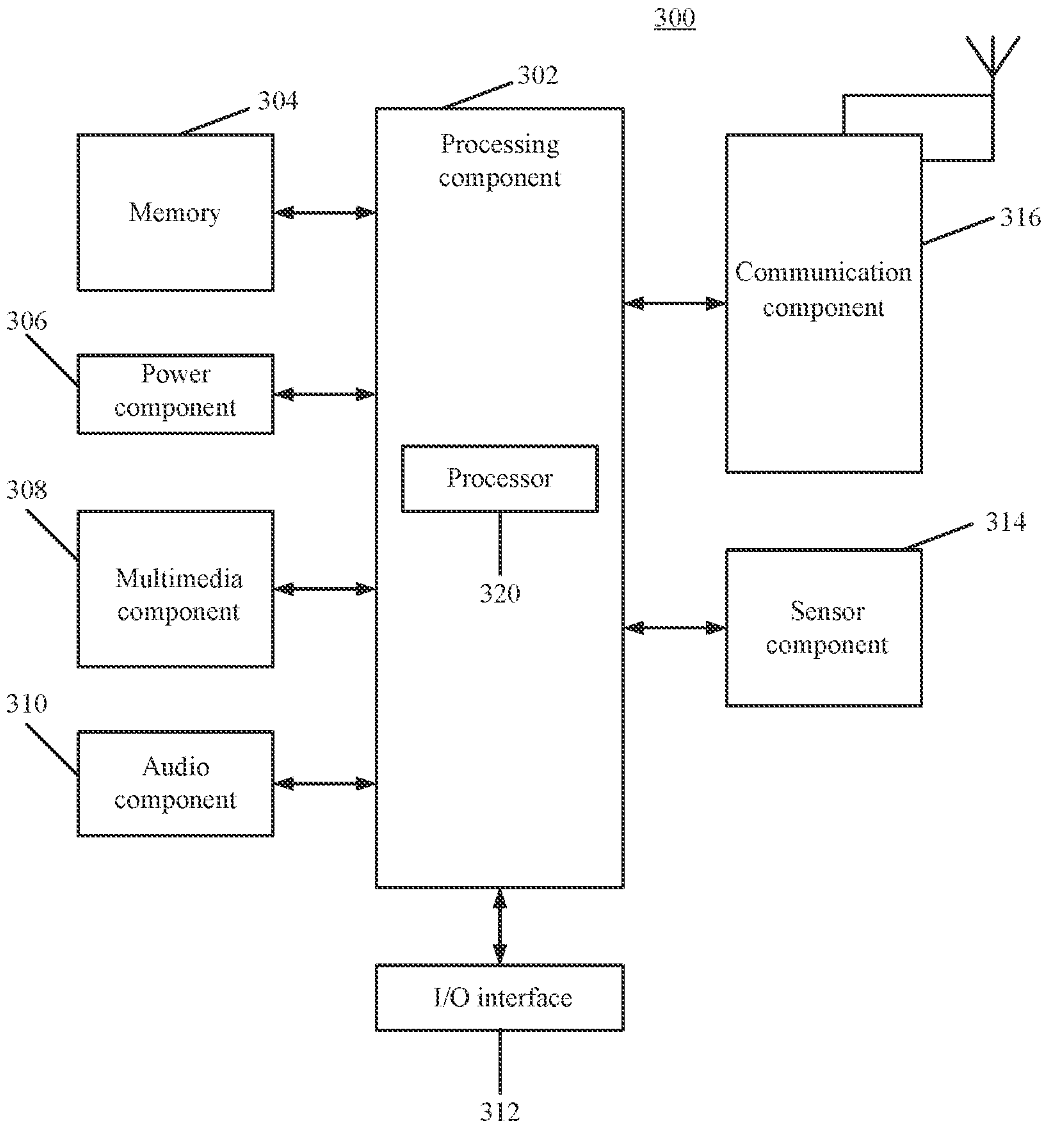
FIG. 13 is a block diagram of a device for monitoring a paging message according to some embodiments.

FIG. 13 is a block diagram of a device 300 for monitoring a paging message according to some embodiments. For example, the device 300 can be a mobile phone, a computer, a digital broadcasting user device, a messaging device, a game console, a tablet device, a medical device, a fitness device, a personal digital assistant, etc.

Referring to FIG. 13, device 300 can include at least one of the following components: a processing component 302, a memory 304, a power component 306, a multimedia component 308, an audio component 310, an input/output (I/O) interface 312, a sensor component 314, and a communication component 316.

The processing component 302 typically controls the overall operation of the device 300, such as operations associated with display, telephone call, data communication, camera operation, and recording operations. The processing component 302 may include one or more processors to execute instructions to complete all or part of the methods described above. In addition, the processing component 302 may include one or more modules to facilitate interactions between the processing component 302 and other components. For example, the processing component 302 may include a multimedia module to facilitate interaction between the multimedia component 308 and the processing component 302.

The memory 304 is configured to store various types of data to support operations in the device 300. Examples of such data include instructions, contact data, phone book data, messages, pictures, videos, and the like for any application or method operating on the device 300. The memory 304 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 306 provides power for various components of the device 300. The power component 306 may include a power management system, one or more power supplies, and other components associated with generating, managing, and distributing power for the device 300.

The multimedia component 308 includes a display screen providing an output interface between the device 300 and the user. In some embodiments, the screen may include a liquid crystal display (LCD) and a touch panel (TP). If the screen includes a touch panel the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 308 includes a front camera and/or a rear camera. When the device 300 is in operation mode, such as shooting mode or video mode, the front camera and/or rear camera can receive external multimedia data. Each front camera and rear camera can be a fixed optical lens system or have focal length and optical zoom capability.

The audio component 310 is configured to output and/or input audio signals. For example, the audio component 310 includes a microphone (MIC), which is configured to receive an external audio signal when the device 300 is in an operation mode, such as a calling mode, a recording mode, and a voice recognition mode. The received audio signal may be further stored in memory 304 or transmitted via communication component 316. In some embodiments, the audio component 310 also includes a speaker for outputting audio signals.

The I/O interface 312 provides an interface between the processing component 302 and peripheral interface modules, which can be a keyboard, click wheel, button, etc. These buttons may include, but are not limited to, the Home button, Volume button, Start button, and Lock button.

The sensor component 314 includes one or more sensors for providing various aspects of condition evaluation for the device 300. For example, the sensor component 314 can detect an open/closed state of the device 300, relative positioning of the components. The component is, for example, a display and a keypad of the device 300. The sensor component 314 can also detect changes in the position of the device 300 or one component of the device 300, presence or absence of the user's contact with the device 300, orientation or acceleration/deceleration of the device 300 and temperature change of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 can access wireless networks based on any communication standard, such as WiFi, 2G or 3G, or a combination thereof. In some embodiments, the communication component 316 receives a broadcast signal or broadcast related information from an external broadcast management system via a broadcast channel. In some embodiments, the communication component 316 also includes a near field communication (NFC) module to facilitate short range communication. For example, the NFC module can be implemented based on radio frequency identification (RFID) technology, infrared data association (IrDA) technology, ultra wideband (UWB) technology. Bluetooth (BT) technology and other technologies.

In some embodiments, the device 300 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods.

In some embodiments, a non-transitory computer-readable storage medium including instructions is also provided, such as a memory 304 including instructions, which can be executed by a processor of the device 300 to complete above methods. For example, the non-transitory computer-readable storage medium can be ROM, random access memory (RAM). CD-ROM, tapes, floppy disks, optical data storage devices, etc.

Figure 14:
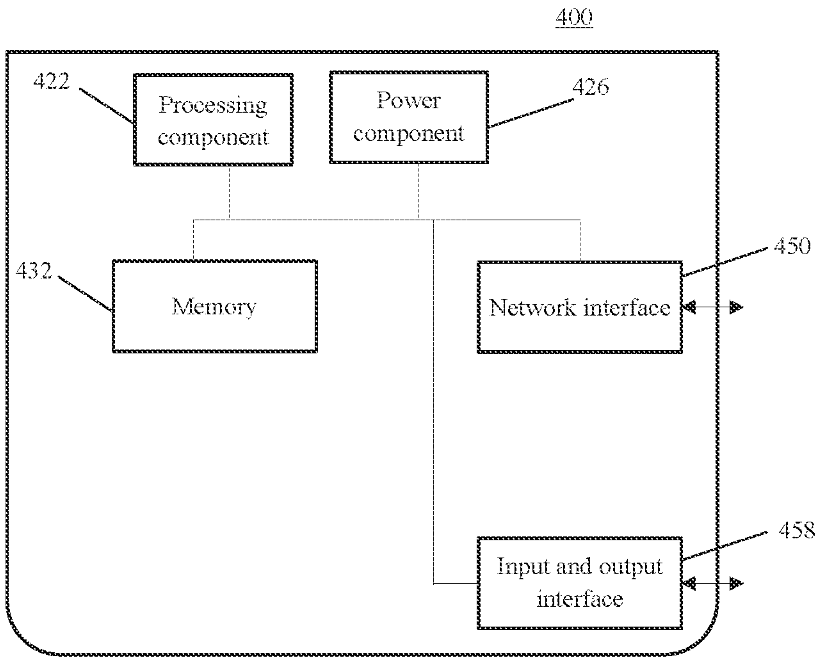
FIG. 14 is a block diagram of a device for monitoring a paging message according to some embodiments.

FIG. 14 is a block diagram of a device 400 for monitoring a paging message according to some embodiments. For example, the device 400 can be provided as a server. Referring to FIG. 14, the device 400 includes a processing component 422, which further includes one or more processors, as well as memory resources represented by a memory 432, for storing instructions that can be executed by the processing component 422, such as application programs. The application programs stored in memory 432 may include one or more modules corresponding to a set of instructions. In addition, the processing component 422 is configured to execute instructions to implement the method described above.

The device 400 can further include a power component 426 configured to perform power management of the device 400, a wired or wireless network interface 450 configured to connect the device 400 to the network, and an input and output (I/O) interface 458. The device 400 can operate operating systems stored on the memory 432, such as Windows Server™, Mac OS X™, Unix™, Linux™, FreeBSD™, or similar systems.

It should be further understood that "multiple" in the present disclosure refers to two or more, and other quantifiers are similar. "And/or" describes an association relationship between associated objects, indicating that there can be three relationships. For example. A and/or B can indicate that A alone, both A and B, or B alone. The character "/" generally indicates that the associated objects have an "or"

relationship. The singular forms “one”, “a” and “the” are also intended to include majority forms, unless the context clearly indicates otherwise.

It should be further understood that the terms “first”, “second” and the like are used to describe various kinds of information, but these information should not be limited to these terms. These terms are only used to distinguish the same type of information from each other, and do not indicate a specific order or importance. In fact, the expressions “first” and “second” can be used interchangeably. For example, without departing from the scope of the present disclosure, the first information can also be referred to as the second information, and similarly, the second information can also be referred to as the first information.

It should be further understood that although the operations in embodiments of the present disclosure are described in a specific order in the drawings, they should not be understood that these operations are required to be performed in the specific order or serial order shown, or that all of the operations shown are required to be performed to achieve the desired results. Multitasking and parallel processing may be advantageous in a particular environment.

After considering the specification and practices of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that the present disclosure is not limited to the precise structure described above and shown in the drawings, and various modifications and changes can be made without departing from its scope. The scope of the present disclosure is limited only by the appended claims.

What is claimed is:

1. A method for monitoring a paging message, performed by a terminal, comprising:

receiving multiple paging indication information, wherein the multiple paging indication information is configured to respectively instruct different types of terminals to monitor the paging message; and determining paging indication information corresponding to a type of the terminal among the multiple paging indication information, and monitoring the paging message based on determined paging indication information;

wherein the different types of terminals comprise a Redcap terminal with one receiving antenna and a Redcap terminal with two receiving antennas, and wherein the multiple paging indication information comprises multiple sub paging indication information.

2. The method according to claim 1, wherein receiving the multiple paging indication information comprises:

receiving the multiple paging indication information based on Physical Downlink Control Channel, PDCCH, wherein the PDCCH comprises multiple first information fields, and the multiple first information fields are configured to instruct different types of terminals to monitor the paging message.

3. The method according to claim 2, wherein the PDCCH further comprises multiple second information fields, and the multiple second information fields are configured to respectively instruct different types of terminals to update a system message.

4. The method according to claim 3, further comprising:

determining a second information field corresponding to the type of the terminal, and updating the system message based on the second information field.

5. The method according to claim 1, wherein receiving the multiple paging indication information comprises:

receiving the multiple paging indication information based on a sequence, wherein the sequence comprises multiple different sequences, and the multiple different sequences are configured to instruct different types of terminals to monitor the paging message.

6. The method according to claim 5, wherein receiving the multiple paging indication information based on the sequence comprises:

receiving the multiple different sequences over different time units.

7. A method for monitoring a paging message, performed by a network-side device, comprising:

sending multiple paging indication information, wherein the multiple paging indication information is configured to respectively instruct different types of terminals to monitor the paging message;

wherein the different types of terminals comprise a Redcap terminal with one receiving antenna and a Redcap terminal with two receiving antennas, and wherein the multiple paging indication information comprises multiple sub paging indication information.

8. The method according to claim 7, wherein sending the multiple paging indication information comprises:

sending the multiple paging indication information based on Physical Downlink Control Channel, PDCCH, wherein the PDCCH comprises multiple first information fields, and the multiple first information fields are configured to instruct different types of terminals to monitor the paging message.

9. The method according to claim 8, wherein the PDCCH further comprises multiple second information fields, and the multiple second information fields are configured to respectively instruct different types of terminals to update a system message.

10. The method according to claim 7, wherein sending the multiple paging indication information comprises:

sending the multiple paging indication information based on a sequence, wherein the sequence comprises multiple different sequences, and the multiple different sequences are configured to instruct different types of terminals to monitor the paging message.

11. The method according to claim 10, wherein sending the multiple paging indication information based on the sequence comprises:

sending the multiple different sequences over different time units.

12. A terminal for monitoring a paging message, comprising:

a processor; and a memory for storing instructions executable by the processor;

wherein the processor is configured to:

receive multiple paging indication information, wherein the multiple paging indication information is configured to respectively instruct different types of terminals to monitor the paging message;

determine paging indication information corresponding to a type of the terminal among the multiple paging indication information; and monitor the paging message based on the paging indication information determined;

wherein the different types of terminals comprise a Redcap terminal with one receiving antenna and a Redcap terminal with two receiving antennas, and wherein the multiple paging indication information comprises multiple sub paging indication information.

13. The method according to claim 5, wherein the different types of terminals further comprise a general terminal and a Redcap terminal, and the Redcap terminal comprises the Redcap terminal with one receiving antenna and the Redcap terminal with two receiving antennas.

14. The method according to claim 13, wherein determining paging indication information corresponding to the type of the terminal among the multiple paging indication information comprises:

determining first paging indication information among the multiple paging indication information as the paging indication information corresponding to the general terminal; and determining second paging indication information among the multiple paging indication information as the paging indication information corresponding to the Redcap terminal.

15. The method according to claim 1, wherein determining paging indication information corresponding to the type of the terminal among the multiple paging indication information comprises:

determining first sub paging indication information among the multiple sub paging indication information as the paging indication information corresponding to the Redcap terminal with one receiving antenna; and determining second sub paging indication information among the multiple sub paging indication information as the paging indication information corresponding to the Redcap terminal with two receiving antennas.

16. The method according to claim 13, wherein determining paging indication information corresponding to the type of the terminal among the multiple paging indication information comprises:

determining a first sequence as the paging indication information corresponding to the general terminal; and determining a second sequence as the paging indication information corresponding to the Redcap terminal.

17. The method according to claim 5, wherein determining paging indication information corresponding to the type of the terminal among the multiple paging indication information comprises:

determining a first subsequence as the paging indication information corresponding to the Redcap terminal with one receiving antenna; and determining a second subsequence as the paging indication information corresponding to the Redcap terminal with two receiving antennas.

18. A network-side device for monitoring a paging message, comprising:

a processor; and a memory for storing instructions executable by the processor;

wherein the processor is configured to perform the method for monitoring a paging message according to claim 7.

19. A non-transitory computer-readable storage medium, wherein the storage medium stores instructions, and when the instructions are executed by a processor, the method for monitoring a paging message according to claim 1 is caused to be implemented.

20. A non-transitory computer-readable storage medium, wherein the storage medium stores instructions, and when the instructions are executed by a processor, the method for monitoring a paging message according to claim 7 is caused to be implemented.

* * * * *